June 13, 1950 M. C. BALCH ET AL 2,511,033
PNEUMATIC CONVEYER
Filed Oct. 29, 1948 6 Sheets-Sheet 1

INVENTORS
H. S. SANDERSON,
BY M. C. BALCH,
Linton & Linton
ATTORNEYS

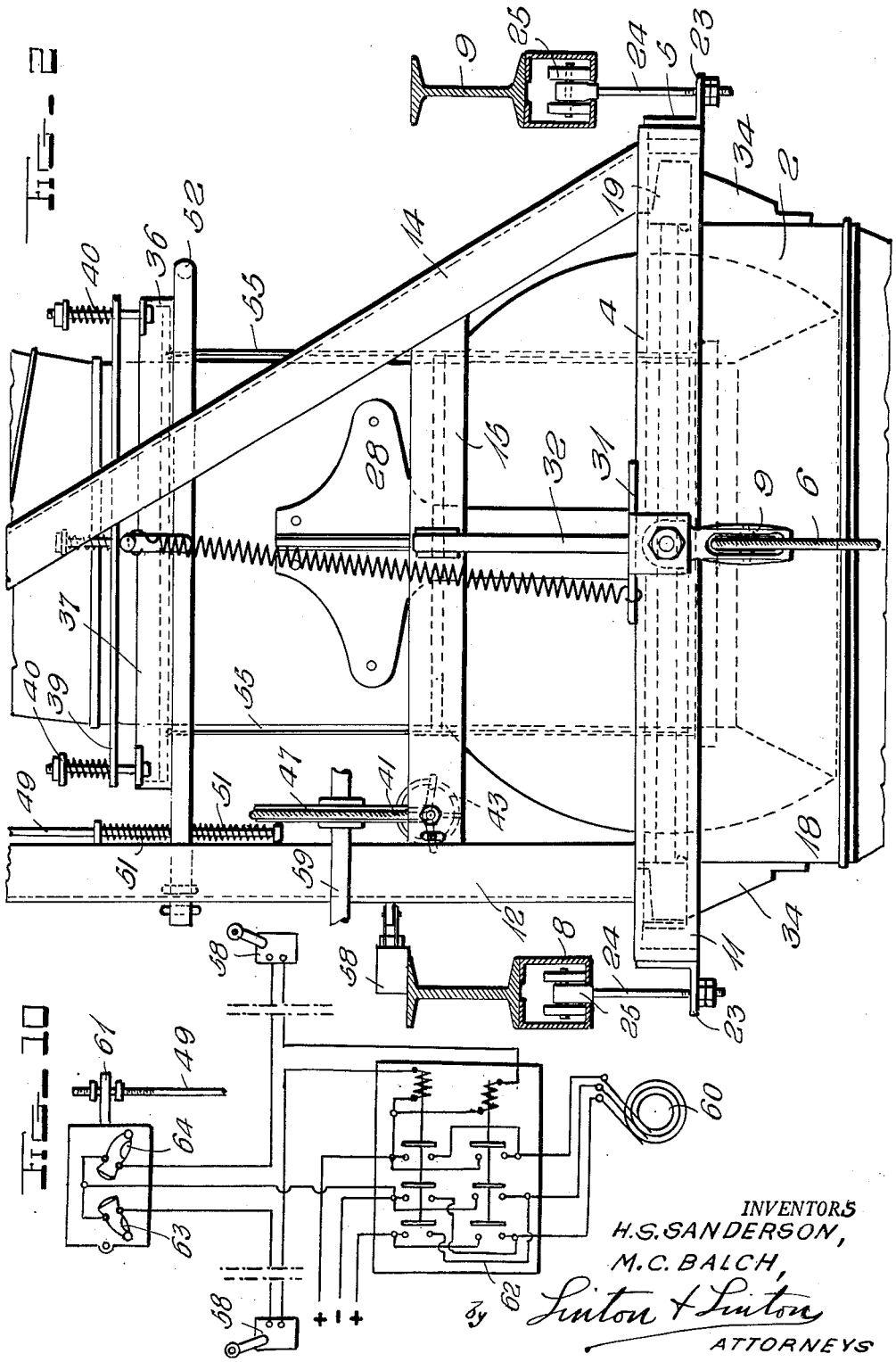

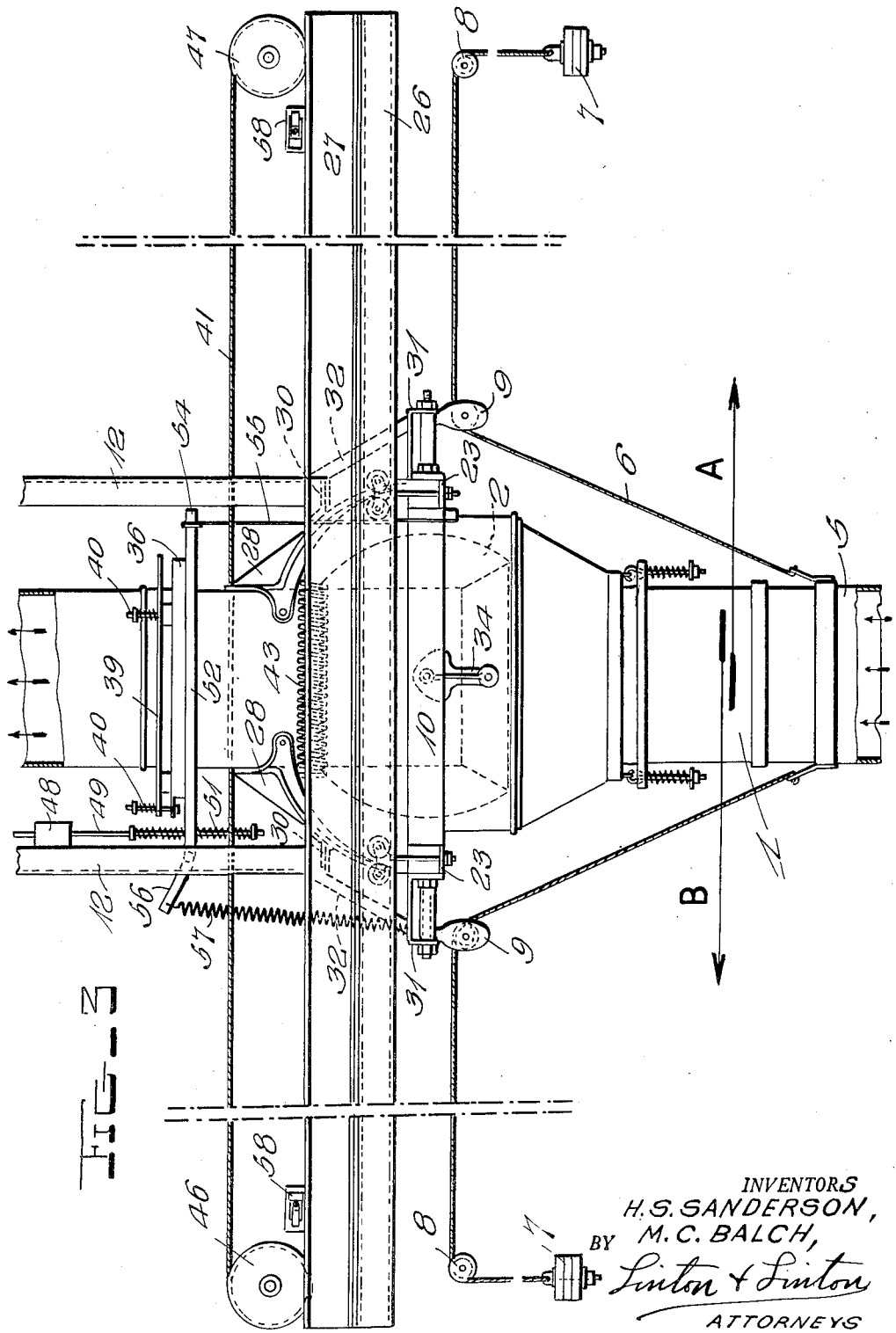

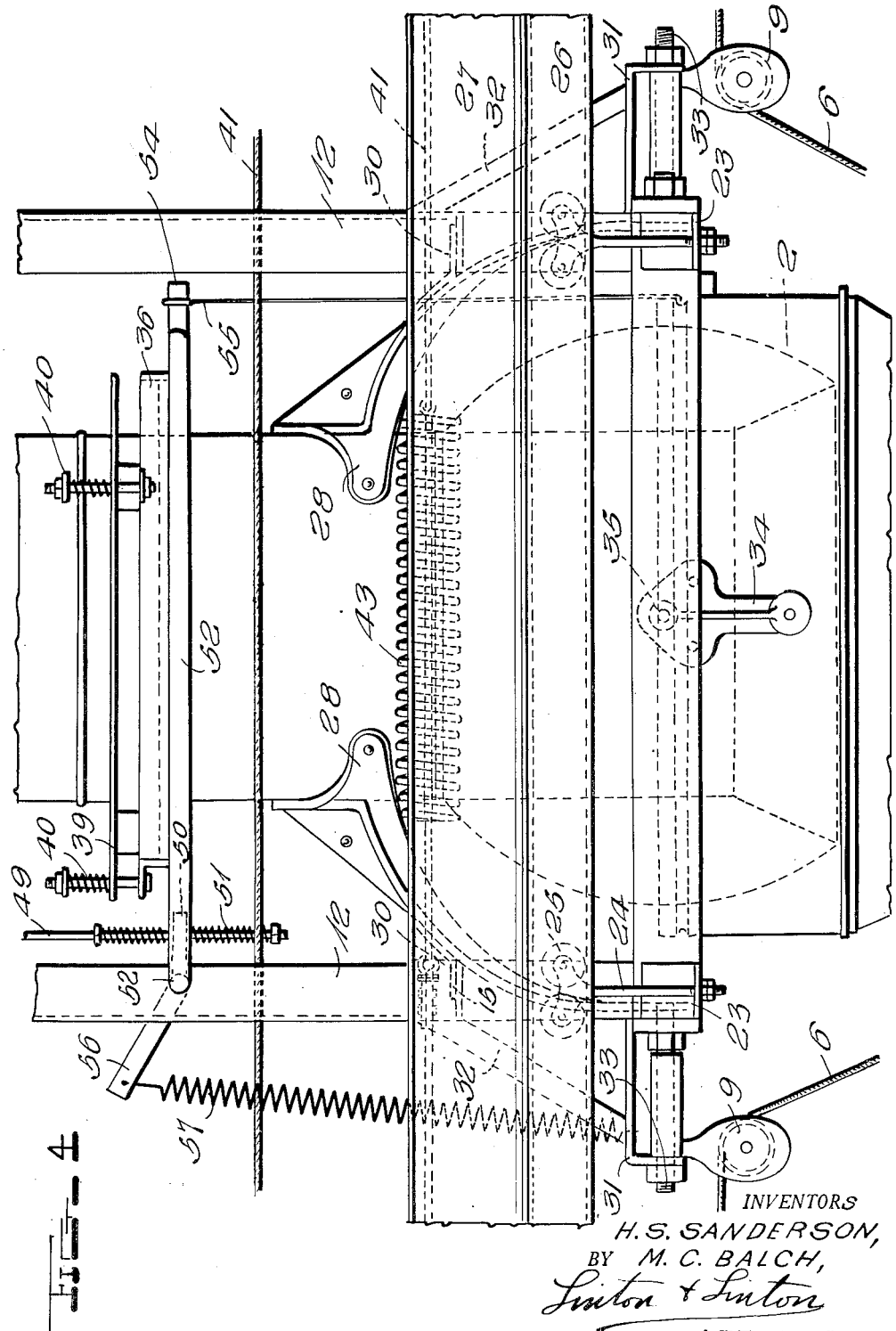

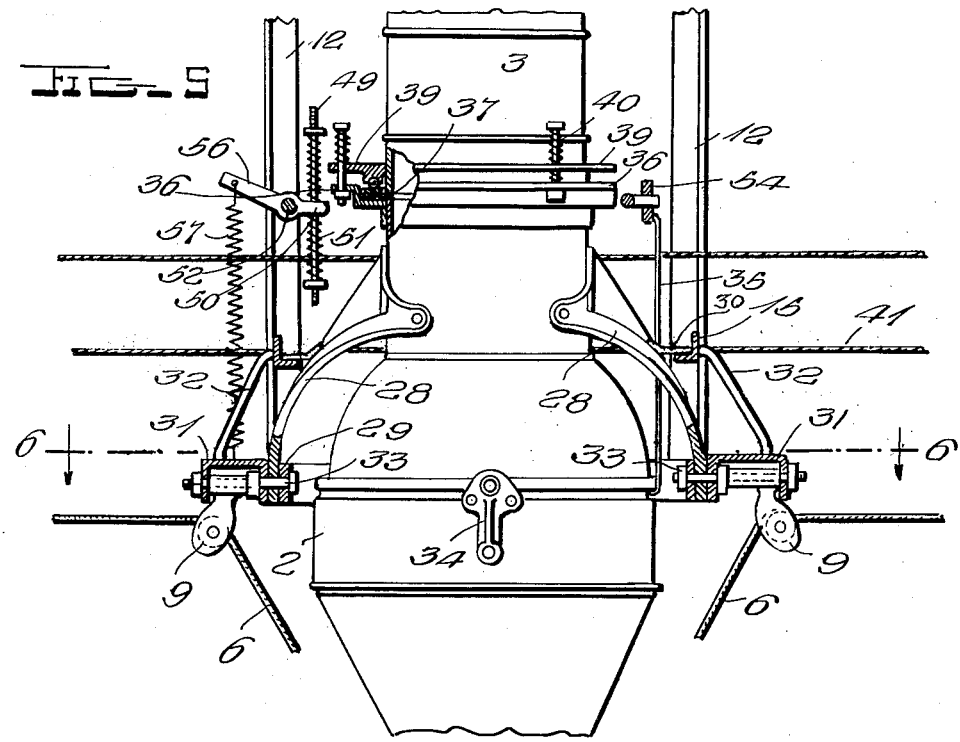
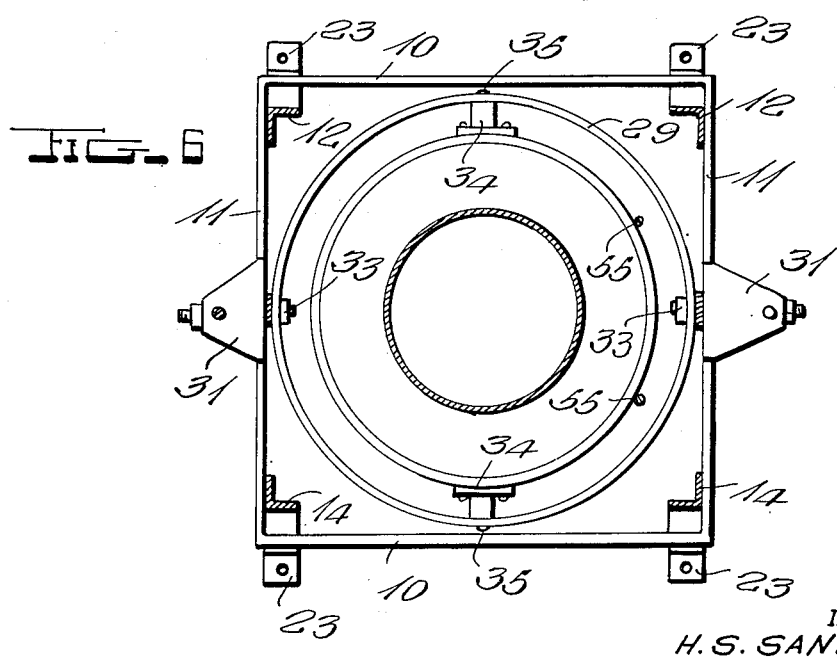

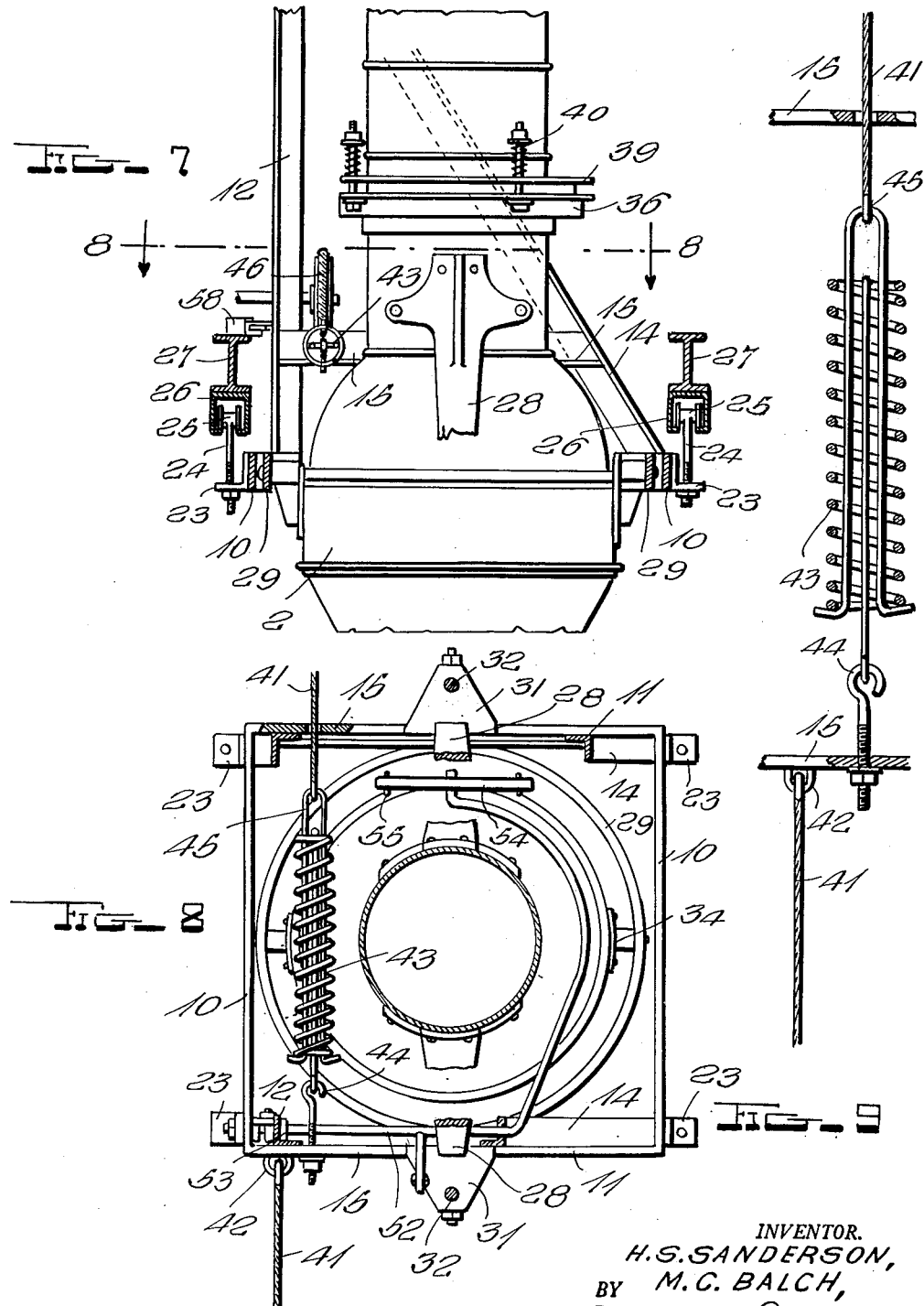

Patented June 13, 1950

2,511,033

UNITED STATES PATENT OFFICE 2,511,033

PNEUMATIC CONVEYER

Murrell Clayton Balch, Madison, and Hansil S. Sanderson, Decatur, Ala.; said Sanderson assignor to said Balch Application October 29, 1948, Serial No. 57,336

5 Claims. (Cl. 302—34)

1

The present invention relates to pneumatic conveyors for unloading seed-cotton from the bed of a truck or wagon and transmitting the same to a cotton gin having among its principal objects to provide means whereby a load of cotton of any size may be conveniently and expediously unloaded and delivered to the gin without delay.

Another equally important object of the invention is to provide an electrically controlled and traveling telescopic conduit for pneumatic conveyors of the foregoing type which can be automatically operated at the will of an individual operator and thereby greatly reduce the costs associated with unloading and conveying seed-cotton.

Other objects will be in part obvious and in part hereinafter pointed out as the description continues:

In the accompanying drawings:

Fig. 2 is an enlarged detail view of the same.

Fig. 3 is a rear elevation of the pneumatic conveyor and supporting tracks.

Fig. 4 is an enlarged detail view of the same.

Fig. 5 is a detail longitudinal section through the traveling carriage showing the pneumatic conveyor in front elevation.

Fig. 6 is a detail horizontal section taken on the line 6—6 of Fig. 5 in the direction of the arrow points.

Fig. 7 is a detail transverse section through the traveling carriage showing the pneumatic conveyor in side elevation.

Fig. 8 is a detail horizontal section taken substantially on the line 8—8 of Fig. 7 in the direction of the arrow points.

Fig. 9 is a detailed sectional view of the shock absorbing spring and connections with the traveling carriage, and Fig. 10 is a diagram of the electrical wiring system with the central switches included therein.

Figure 1:
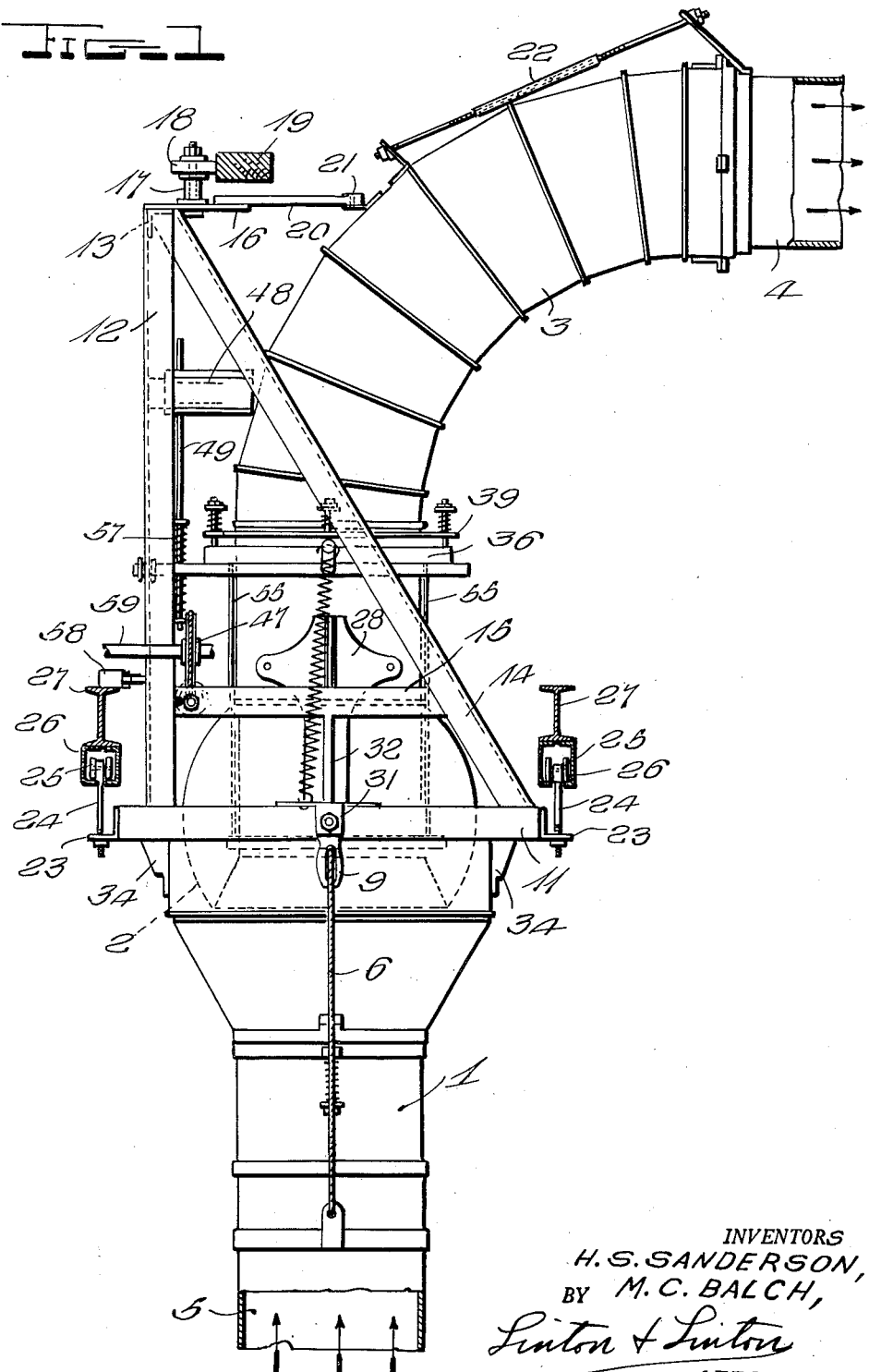
Fig. 1 is a side elevation of the pneumatic conveyor embodying the present invention with the supporting and guiding tracks therefor shown in cross section.

The conventional pneumatic conveyors for unloading seed-cotton from the bed of a wagon or truck and delivering the same to a cotton gin usually consists of a conduit comprising a vertically extending and supported telescopic section 1 connected by a universal joint 2 to an angular section 3 which latter extends at substantially 90 degrees from the vertical section 1 having an outlet end connected to a horizontally extending telescopic section 4 which enters the cotton gin

2 for delivering the seed cotton thereto in the usual manner. The suction created within this conduit causes the cotton to enter the lower end of the telescopic section 1 and exhaust from the telescopic section 4 in the direction of the arrow points as best shown in Fig. 1 of the drawings. Such pneumatic conveyors only have a capacity of unloading about one bale of cotton from the vehicle, but according to the present invention two to ten bales of cotton to the load may be now unloaded without delay and conveyed to the gin whereby one may obtain increases of twelve to fifteen per cent in the cotton ginned.

The conduit of this pneumatic conveyor is supported upon a traveling carrier or truck with the telescopic section 1 suspended therefrom whereby the lower intake end thereof may extend over and rest lightly upon the seed cotton within the bed of a wagon. The universal joint 2 permits the section 1 to be handled over a small radius without moving the conduit and yet the traveling carrier will permit the conduit to travel over the entire length of the wagon having the seed cotton stored in the bed thereof. To counterbalance the vertically sliding tube 5 of the telescopic section 1 cables 6 connect the same to the counterweights 7. These cables extend over the stationary rollers 8 and the traveling sheaves 9 whereby the intake end of the section 1 will be raised and lowered according to the height of the cotton contained in the bed of the wagon.

This traveling carrier or truck consists of an opened frame comprising a base section formed from the side bars 10 and the end bars 11 which are connected at their opposite ends by welding or any other suitable connecting means. A super structure is connected to and supported upon the base section of the truck and consists of two vertically extending angle bars 12 having their lower ends connected to the end bars 11 and their upper ends are connected together by means of the top angle bar 13. Diagonally extending angle bars 14 connect the top bar 13 with the forward side bar 10 and horizontal reinforcing bars 15 connect the bars 12 and 14. A plate 16 is secured to the bar 13 and supports a stub shaft 17 carrying a roller 18 which latter rides upon beam 19 supported at its opposite ends within a building or other support wherein the pneumatic conveyor is housed. A bar 20 has one end connected to the plate 16 and its opposite end pivotally connected as at 21 to the angular section 3 of the conduit. An adjustable turnbuckle supporting connection 22 is provided between the sections 3 and 4 of the conduit.

Angle plates 23 are connected to the opposite ends of the side bars 10 and each have adjustably connected thereto a rod 24. These rods 24 are each suspended from a roller bearing truck 25 adapted to travel within the track ways 26. These trackways 26 are secured to and suspended from the I-beams 27 and the latter have their opposed ends anchored within a suitable support or building wherein the pneumatic conveyor is housed. From this arrangement it is apparent that the traveling carrier or truck is free to travel longitudinally along the track ways 26 and the weight of the angular section 3 of the conduits maintain the roller 18 in contact with the beam 19 so as to prevent the conduit from tilting forwardly due to the weight of the sections 3 and 4 of the conduit and yet permits the free traveling movement of the carrier and conduits supported thereby.

The upper or male section of the universal joint 2 has secured thereto two diametrically oppositely arranged brackets 28 and the lower end of each bracket terminates between the side bars 11 and an annular or ring shaped bar 29 whereas angle plates 30 connect the medial portions of each bracket to a reinforcing bar 15. Brackets 31 each have one end secured to a side bar 11 and reinforcing diagonally extending bars 32 connect the same with the angle bars 15. Bolts 33 extend through the ring bar 29, the lower ends of the brackets 28, the side bars 11 and the outer ends of the brackets 32 for rigidly connecting the same together. A sheave 9 is connected to and suspended from each bolt 33 so that they will be carried with the traveling carrier or truck and yet be free to swing laterally with respect thereto.

The female member of the universal joint 2 has secured thereto two diametrically oppositely disposed brackets 34 in which are rotatably supported spindles having their outer ends connected as at 35 to the ring bar 29 whereby the lower telescopic section 1 may be free to swing laterally in opposite directions over the bed of a wagon when removing the cotton therefrom.

A dry lubricated swivel joint is provided in the conduit whereby the angular section 3 thereof may oscillate horizontally about the stationary male member of the universal joint 2. An annular flange 36 is secured to the upper end of the tubular section of the male member of the universal joint and has seated therein graphite packing ring 37 and the lower end of the angular section 3 terminates in a flange 38 that is seated upon the packing ring 37. A floating ring 39 having ball bearing contacts is adjustably connected as at 40 with the annular flange 36 for establishing a seal therebetween and yet permits the free rotating movement of the section 3 with respect to the male member of the universal joint.

An endless cable 41 is employed for driving the traveling carrier or truck back and forth upon its track-way 26 and has one end connected to a bar 15 by means of an eye bolt 42 whereas its opposite end extends through the other bar 15 and is connected to a coil spring 43. One end of this coil spring 43 has an extension connected to an eye bolt 44 fastening to a bar 15 whereas the opposed extension of this coil spring is connected to the cable 41 as at 45. As the cable 41 travels back and forth the traveling carrier or truck will be carried therewith and the coil springs acts to take-up any shocks that may occur during the stop and starting movements thereof. This cable travels over an idler pulley 46 and a power driven pulley 47.

A master control switch box 48 is mounted upon a vertical bar 12 and is provided with a vertically movable control rod 49. This rod 49 is connected to an arm 50 of a lever pivotally supported upon a bar 12 by means of the coil springs 51 whereby when the arm 50 is in the position as best shown in Fig. 1 of the drawings the switches within the box 48 will be opened, but when the arm 50 moves downwardly one switch will be closed and when moved upwardly the other of said switches within the box 48 will be closed. The arm 50 is secured by a rotatable shaft 52 having one end mounted in a bearing 53 of the angle bar 12 and the intermediate portion of this shaft extends through one of the diagonal bars 14 so as to provide another bearing support therefor. The outer or free end of this shaft 52 extends about the upper part of the universal joint 2 as best shown in Fig. 8 of the drawings and has pivotally connected to its outer extremity a lever 54. Connected to the opposite ends of the lever 54 is a pair of vertically extending cables 55 and the lower ends of each cable is connected to the female section of the universal joint. The lever 54 and two cables 55 provided merely for the purpose of straddling a bracket 28 arranged between the shaft 52 and the lower or female section of the universal joint. The lever secured to the shaft 52 is provided with another arm 56 extending at an angle to the arm 50 and is connected to a bracket 31 by means of a coil spring 57 which normally tends to rotate the shaft 52 in one direction as would elevate the rod 49. However, the connection between this shaft 52 and the lower end of the conduits retain the arm 50 against the tension of the coil spring 57 in the horizontal position as shown in the drawings which can be termed the neutral or opened positions of the electrical switches mounted with the box 48. As the pneumatic conveyor is swung upon its pivotal supports 34 in the direction of the arrow B shown in Fig. 3 of the drawings a downward pull will be exerted upon the cables 55 and the shaft 52 will be rotated to move the arm 50 downwardly which in turn will exert a downward pull upon the switch rod 49. When swinging the pneumatic conveyor in the direction of the arrow A the cables will be released whereupon the spring 57 will cause the shaft 52 to rotate in an opposite direction to lift the rod 49. Conventional micro switches 58 are mounted upon one of the I-beams 27, one at each end thereof and said switches are normally closed. The actuators of these micro switches 58 extend within the travel of the carrier or truck so that when one of the angle bars 12 thereof strikes an actuator the micro switch thereof will be moved to its opened position.

The power unit for rotating the shaft 59 so that the drive pulley 47 connected thereto may rotate in opposite directions is preferably an electric motor 60 included in a three phase power circuit as shown in Fig. 10 of the drawings. Included in this electric circuit are the two normally closed micro switches 58. Within the switch box 48 there is pivotally supported a lever 61 having mounted thereon two mercury tubes set in reverse with a neutral position therebetween. These switches handle two phases of the three phase electric circuit through a magnetic reversing switch 62 whereby the motor will be caused to rotate in opposite directions. When the control lever 49 is pulled downwardly the mercury tube 63 will close the electrical circuit whereby the conveyor will be caused to travel along its tracks in the direction of the arrow B shown in Fig. 3 and as the rod 49 is raised the mercury tube 64 will close the electrical circuit whereby the conveyor will be caused to travel in the reverse direction or that indicated by the arrow A in Fig. 3. In operation a wagon containing the seed cotton to be unloaded and conveyed to the gin passes below the intake end of the telescopic section 1 of the conduit and through the counter weights it adjusts itself to the height of the cotton loaded upon the bed of the wagon. As a suction is created within the conduit the cotton will be drawn from the wagon and delivered to the gin. The telescopic section 1 may be moved about a small radius to draw the cotton from the opposite side of the bed of the wagon. As it becomes necessary to move the conveyor to other positions upon the wagon bed the operator simply swings the section 1 upon its pivot support 34. When the operator moves the section 1 in the direction of the arrow A in Fig. 3 the shaft 52 will be released and the coil spring 57 will rotate this shaft for raising the arm 49 whereupon the electric switch 64 will be closed and the motor caused to drive the pulley 47 in an anticlockwise direction. The cable 41 will then draw the carriage and pneumatic conveyor mounted thereupon in the same direction as that of the arrow A. When the exact position of the intake end of the conveyor is positioned upon the cotton to be unloaded the operator releases the section 1 where it will automatically return to its vertical position and the switch 64 move to its opened or neutral position for stopping the drive to the carrier or truck. When it is necessary to move the intake end of the conveyor in an opposite direction or that indicated by the arrow B the operator moves the section 1 in that direction whereupon a downward pull is exerted upon the cables 55, which in turn through the shaft 52 pull the control rod 49 downwardly and thereby close the switch 64. When the switch 64 is closed the motor will be caused to rotate in an opposite direction and cause the carrier with the pneumatic conveyor to move in the direction of the arrow B. When the desired position of the intake end of the conveyor has been reached the operator again releases the section 1 whereby it will again return to its normal vertical position whereat the mercury switches 63 and 64 will be retained in their opened or neutral positions and the traveling movement of the carrier automatically stopped. As the traveling carrier reaches either end of its track way it will strike the actuator of a switch 58 for opening the electrical circuit and thereby stop the carrier.

We claim:

1. A pneumatic conveyor comprising in combination a track, a truck movable along said track, a conduit supported by said truck, means for driving said truck in opposite directions upon said track, control means for said driving means and means for connecting said control means to said conduit whereby when said conduit is moved in one direction said truck will carry said conduit in that direction and when moved in an opposite direction said truck will carry said conduit in the latter direction.

2. A pneumatic conveyor comprising in combination a movable conduit, means for driving said conduit in opposite direction, control means for said driving means and connected to said conduit, means for normally retaining said conduit in one position whereat said control means will be disconnected with said driving means and means whereby when said conduit is moved into opposite directions said control means will automatically cause said driving means to move said conduit in that direction in which said conduit is moved.

3. A pneumatic conveyor comprising in combination a conduit, a telescopic section movably connected to said conduit, means for driving said conduit in opposite directions and means for connecting said telescopic section with said driving means whereby when said telescopic section is moved in either direction said conduit will be caused to move in the same direction as that in which said telescopic section is moved.

4. A pneumatic conveyor comprising in combination a conduit, a traveling carrier, means for supporting said conduit within said carrier, a telescopic intake movably connected to said conduit, means for counter balancing the movable section of said telescopic intake, means for driving said carrier in opposite directions and control means for connecting said driving means with said telescopic intake whereby when said telescopic intake is moved in opposite directions said carrier will be driven in opposite directions.

5. The combination with a track-way, a truck adapted to travel in opposite directions upon said track-way, a pneumatic conveyor supported within and suspended from said track-way, motor driven means for said truck, control means carried by said truck and connected to said motor driven means and means connecting said control means with said pneumatic conveyor whereby said motor driven means may be automatically controlled by moving said pneumatic conveyor.

MURRELL CLAYTON BALCH.
HANSIL S. SANDERSON.

REFERENCES CITED

The following references are of record in the file of this patent:

UNITED STATES PATENTS

| Number | Name | Date |
|---|---|---|
| 1,918,133 | Rennels | July 11, 1933 |